United States Patent
Hsu et al.

(10) Patent No.: US 7,296,172 B2
(45) Date of Patent: Nov. 13, 2007

(54) POWER CONTROL AND MANAGEMENT METHOD FOR UNINTERRUPTIBLE POWER SYSTEM AND SERVERS

(75) Inventors: Judy Hsu, Taipei (TW); Yu-Hua Hsu, Taipei (TW); Chun-Liang Lee, Taipei (TW)

(73) Assignee: Inventec Corporation, Taipei (TW)

( * ) Notice: Subject to any disclaimer, the term of this patent is extended or adjusted under 35 U.S.C. 154(b) by 512 days.

(21) Appl. No.: 10/923,844

(22) Filed: Aug. 24, 2004

(65) Prior Publication Data

US 2006/0047979 A1  Mar. 2, 2006

(51) Int. Cl.
*G06F 1/30* (2006.01)
(52) U.S. Cl. .................... 713/340; 713/330
(58) Field of Classification Search ............ 713/300, 713/320, 324, 330, 340
See application file for complete search history.

(56) References Cited

U.S. PATENT DOCUMENTS

| | | | |
|---|---|---|---|
| 4,611,289 A * | 9/1986 | Coppola | 713/300 |
| 5,534,734 A * | 7/1996 | Pugh et al. | 307/38 |
| 5,612,580 A * | 3/1997 | Janonis et al. | 307/64 |
| 5,717,934 A * | 2/1998 | Pitt et al. | 713/330 |
| 5,794,031 A * | 8/1998 | Nakadai | 713/2 |
| 7,002,265 B2 * | 2/2006 | Potega | 307/149 |
| 2002/0138772 A1 * | 9/2002 | Crawford et al. | 713/300 |
| 2003/0037150 A1 * | 2/2003 | Nakagawa | 709/229 |
| 2005/0097374 A1 * | 5/2005 | Aharonian et al. | 713/300 |

* cited by examiner

*Primary Examiner*—Dennis M. Butler
(74) *Attorney, Agent, or Firm*—Rabin & Berdo, P.C.

(57) ABSTRACT

A power control and management method for servers connected to an uninterruptible power system (UPS) comprises: detecting current power supply statuses of the UPS and the servers; detecting instantaneous status data of the UPS and the servers to generate a server power control and management table; and according to the server power control and management table, determining an activation time of the UPS and a shutdown sequence of the servers.

12 Claims, 4 Drawing Sheets

POWER CONTROL AND MANAGEMENT METHOD FOR UNINTERRUPTIBLE POWER SYSTEM AND SERVERS

BACKGROUND OF THE INVENTION

1. Field of Invention

The present invention relates to a power control and management method, and particularly to a power control and management method implemented with an uninterruptible power system (UPS) and a number of servers connected to the UPS.

2. Related Art

To prevent either accidental power interruptions or abnormal levels of power supply, a UPS is usually required for server computers. Generally, a UPS can be divided into an off-line type UPS and an online type UPS. The off-line type UPS usually is cheaper to produce. When the AC power is normally supplied, it is directly delivered to the computer. When there is a power failure, the UPS immediately switches to an internal DC battery that, via a converter, provides AC power to the computer. Because it is activated only when there is power failure, this type of UPS is also called a standby UPS. When there is power failure, the off-line UPS switches from the domestic power source to the internal battery, which usually causes a short interruption at the switch transition time. However, because the capacitors in the switching power supply of the computer system provides sufficient power during the short power interruption, the computer system is not affected during short UPS switch transitions. However, as the power output increases, it becomes increasingly difficult to perform short and stable switch transitions. Therefore, the off-line UPS conventionally has a lower power output. Further, because the off-line UPS is not activated when the domestic power source is generally normal, the computer system is not protected against very sudden abnormal power surges.

In the conventional online UPS, the normal domestic power supply first passes through a charging circuit of the UPS to both deliver power to the computer system and at the same time charge the UPS. When there is power failure, the internal battery provides the required power, and there is no switching event. Therefore, the online UPS does not have the disadvantages of power interruptions, due to switching transitions. Further, because the domestic power first passes through the charging and stabilizing circuit of the UPS, power spikes, surges or other undesired parasitic effects can be filtered out, which allows a more stable operation of the computer system. The online UPS conventionally is more expensive to manufacture, because there is a higher standard requirement for its components.

In addition to provide necessary power to the computer, the UPS can be also connected via a RS232 cable to the computer COM port so as to enable, for example, a UPS management program of the operating system Windows NT to communicate with the UPS. Via this interface, the UPS management program can access to information such as the UPS current power voltage, electric current, frequency, temperature, load capacity, etc. The UPS management program can be also operable to set the UPS to timely switch off or switch on the computer. For example, when an abnormal event occurs, such as a power failure or insufficient battery power, the UPS can consequently inform Windows NT so that the operating system can timely conduct adequate actions. For example, if there is power failure, the operating system can switch off the computer; before the UPS battery is completely empty, a signal can be sent to Windows NT so that the UPS management program can set the execution of a specific program before the computer shutdown and outputs a signal commanding the UPS shutdown after the computer is shut down.

Various disadvantages can be observed in the conventional UPS implementation. When a single UPS is used to supply a number of load systems, a proper power allocation cannot be obtained due to overload of the UPS internal battery. Therefore, each of the load systems usually cannot complete its work and switch off in optimal conditions. In addition, the traditional UPS implementation does not enable a central management of the power use of the load systems and neither allows for an optimal use of the UPS battery power.

Therefore, there is a need for a power control and management method for managing the UPS battery power, alerting the user of the remaining time the UPS battery can sustain, and the service life of the UPS battery. In particular, there is a need for a method that can conduct an optimal power allocation according to the work amount and the priority of the load systems.

SUMMARY OF THE INVENTION

It is therefore an object of the invention to provide a power control and management method that is implemented with a plurality of servers connected to a UPS, and can overcome the problems of the prior art.

In order to achieve the above and other objectives, the power control and management method comprises: according to the status, data of the UPS and the servers, determining the UPS activation time; when the UPS is activated, centrally managing the servers supplied with power so that all the servers are shut down according to a normal sequence; and according to the server power use, conducting a power allocation so as to reduce the UPS power consumption speed.

According to an embodiment of the invention, the power control and management method further comprises: detecting current power supply statuses of the UPS and the servers; detecting instantaneous status data of the UPS and the servers to generate a server power control and management table; and according to the server power control and management table, determining an activation time of the UPS and a shutdown sequence of the servers.

BRIEF DESCRIPTION OF THE DRAWINGS

The present invention will become more fully understood from the detailed description given herein below illustration only, and is thus not limitative of the present invention, wherein.

DETAILED DESCRIPTION OF THE INVENTION

The invention describes a method that uses a computer software program to control and manage power of an uninterruptible power system and servers. The power control and management software program of the invention can be implemented in any serverequipped with UPS hardware according to a terminate and stay resident (TSR) or other schemes.

Figure 1:
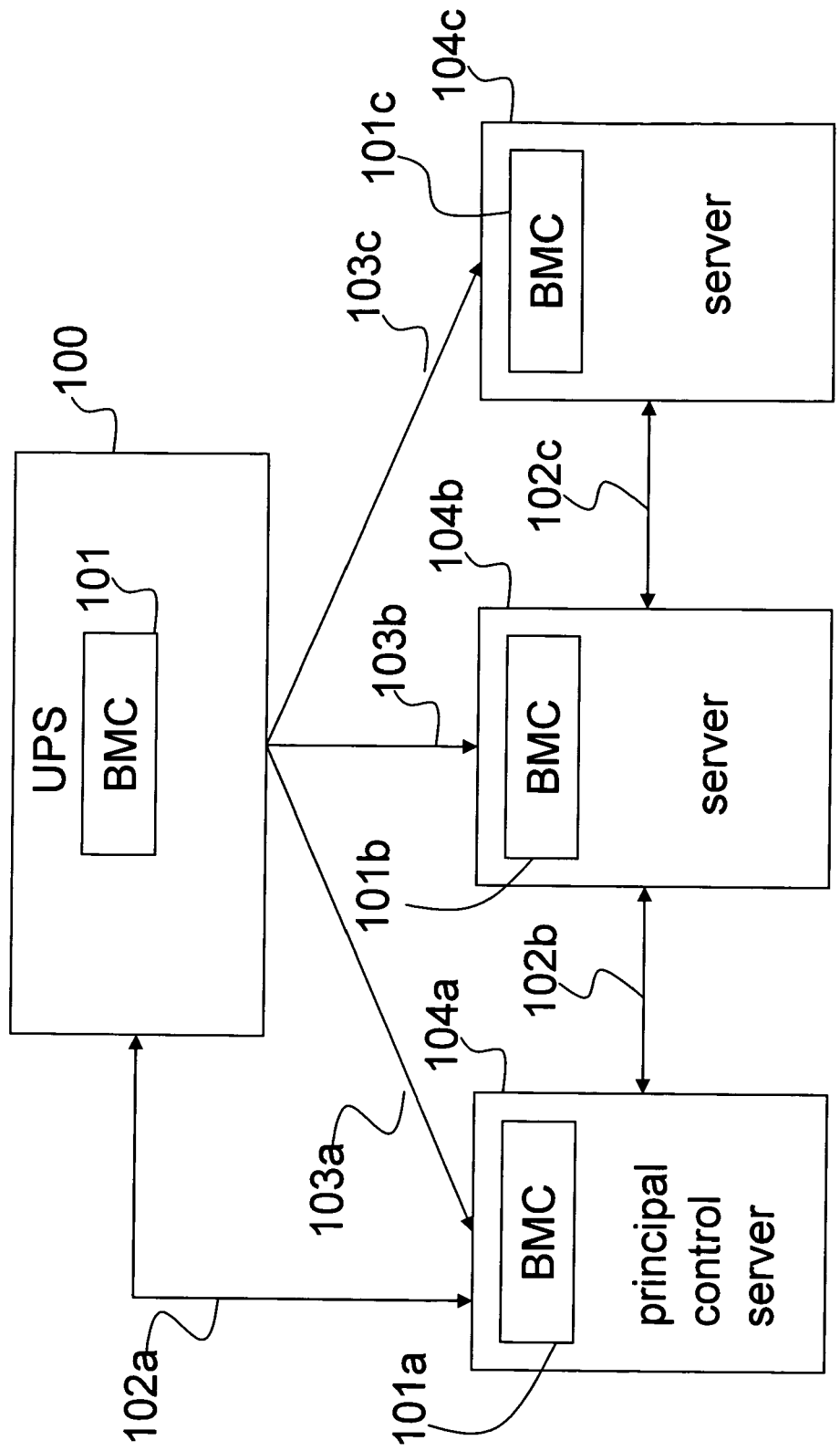
FIG. 1 is a block diagram of the connection structure between a UPS and a plurality of servers implemented with a power control and management method according to a first embodiment of the invention.

FIG. 1 is a block diagram of the connection structure between a UPS and a plurality of servers implemented with a power control and management method according to a first embodiment of the invention. A UPS 100 is connected to a plurality of servers (104a, 104b, 104c). The UPS 100 can be an online type UPS or an off-line type UPS. The UPS and the servers respectively have an intelligent chassis management bus (ICMB) interface (not shown) and an inner intelligent platform management interface (IPMI, not shown) used for remote terminal control. The IPMI defines at the central terminal whether the management and monitoring of the remote server are to be conducted via LAN or serial modem paths. The IPMI thereby provides functions such as monitoring the system status, generating warning signals if serious events occur, automatically controlling the system (for example, interrupting power or restarting), and recording systems events, etc. The UPS 100 and each server (104a, 104b, 104c) further include an IPMI core structure, composed of micro-controllers or board management controllers (also called BMC) (101a, 101b, 101c). The BMC (101a, 101b, 101c) constitute the intelligence of the IPMI. The BMC control the interface between the system management software and the platform management hardware, provide self-monitoring, event recording and control recovering functions. The BMC can be also used as a network channel between the system management software and the ICMB interface (not shown). Via the BMC (101a, 101b, 101c), the IPMI (not shown) and the ICMB interface, the UPS and each server (104a, 104b, 104c) or other computer devices having similar interfaces can mutually transmit signals, or transmit signals with a terminal system. A server that is immediately connected via ICMB signal line 102a to the UPS (or another server having similar interfaces) will be defined as a principal control server 104a. In FIG. 1, the principal control server 104a is serially connected via the ICMB signal line to two other servers (104b, 104c). In other words, the principal control server 104a is connected via the ICMB signal line 102b to the server 104b, and the server 104b is connected via the ICMB signal line 102c to the server 104c. The servers (104a, 104b, 104c) are supplied with power respectively via power lines (103a, 103b, 103c).

Figure 2:
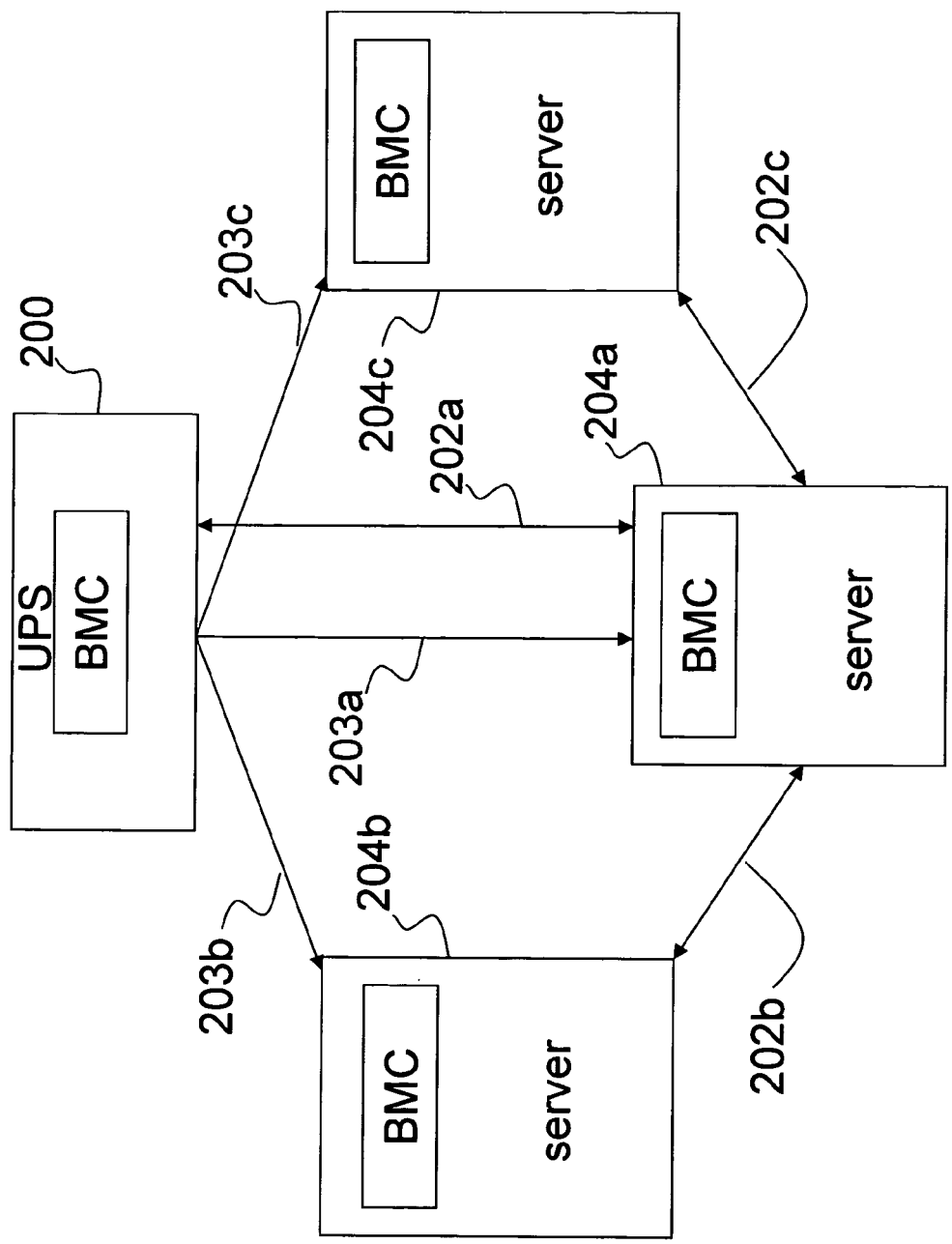
FIG. 2 is a block diagram of the connection structure between a UPS and a plurality of servers implemented with a power control and management method according to a second embodiment of the invention.

FIG. 2 is a block diagram of the connection structure between a UPS and a plurality of servers implemented with a power control and management method according to a second embodiment of the invention. A UPS 200 is connected to a plurality of servers (204a, 204b, 204c). The UPS 200 and the servers (204a, 204b, 204c) are respectively supplied with power via power lines (203a, 203b, 203c). The server immediately connected via ICMB signal line 202a to the UPS 200 is defined as a principal control server 204a. The principal control server 204a is connected via the ICMB signal line 202b, 202c respectively to the server 204b, 204c.

Figure 3:
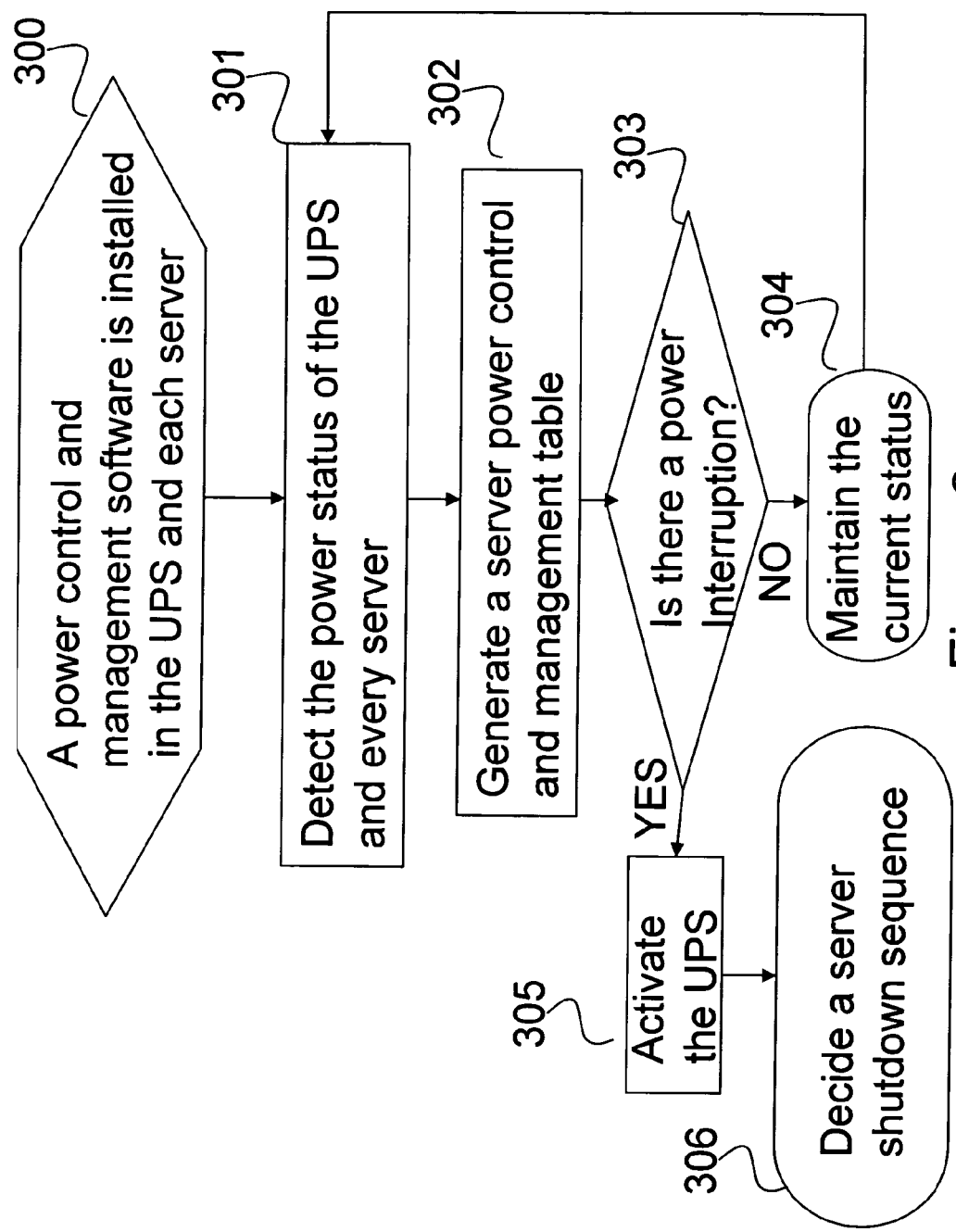
FIG. 3 is a flowchart of a power control and management method, specifically describing the process of the UPS, according to an embodiment of the invention.

FIG. 3 is a flowchart of a power control and management method, specifically describing the process of the UPS, according to an embodiment of the invention. Initially, a power control and management software is installed in the UPS and each server is being connected to the UPS (step 300). The power control and management software of a principal control server (defined as the server being adjacently connected via an ICMB signal line to the UPS) detects via one ICMB signal line the respective power status of the UPS and every server being connected via ICMB signal lines to the principal control server (step 301). The resulting power status data are collected, and a server power control and management table is generated (step 302). According to the demand, the user can define through the power control management program the priority level of each server. According to the data of the server power control and management table stored in the principal control server, i.e. respective power status data of the UPS and all the servers, the power control and management program determines whether there is power interruption (step 303). If there is power interruption, the UPS is activated (step 305), and a warning signal is delivered to all the servers. According to the priority level and the power status data of each server, the power control and management program then decides a server shutdown sequence (step 306). If there is no power interruption, the servers maintain their current status (step 304), and steps 301~303 are repeated.

Figure 4:
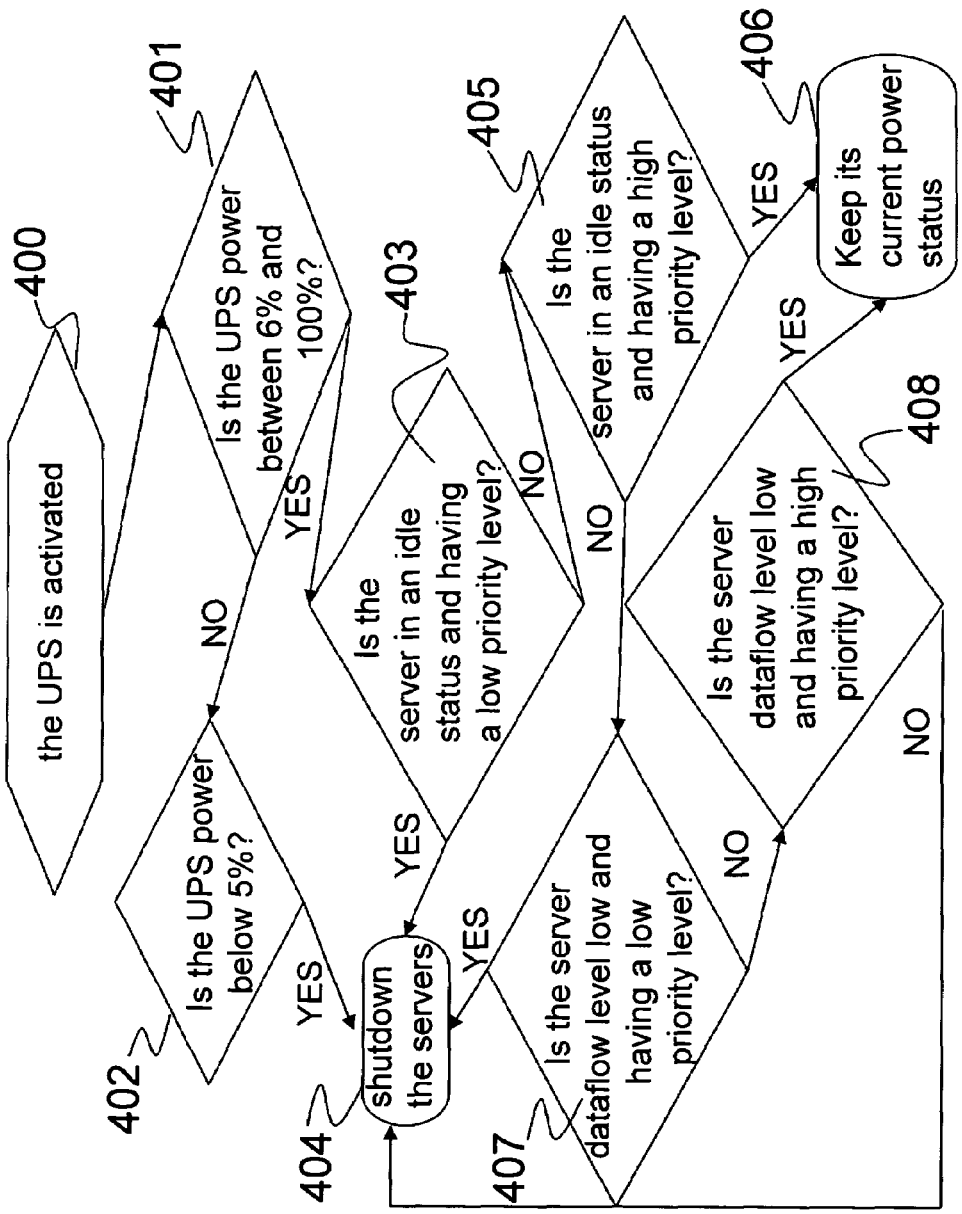
FIG. 4 is a flowchart of a server shutdown sequence implemented by the UPS to provide power according to an embodiment of the invention.

FIG. 4 is a flowchart of the server shutdown sequence implemented by the UPS to provide power according to an embodiment of the invention. When the UPS is activated and supplies the servers with power (step 400), UPS and server instantaneous status data are detected. The instantaneous status data are accessed via the ICMB signal lines and stored in the server power control and management table. These data include the respective power consumption of the UPS and servers and the server data processing status. According to these data, the server dataflow level is determined. The user particularly can define the priority level of each server. According to the power data and the server status recorded in the power control and management table, including the dataflow level and the priority level, it is determined whether the UPS power is between 6% and 100% (step 401). The power range particularly includes a lower power limit at which a server has to be shut down. The user can perform these settings. If the UPS power is not between 6% and 100%, the UPS power is considered below 5% (step 402). In this embodiment, the level of 5% is considered as being the lower limit at which the servers have to switch off. A signal then is outputted via the ICMB signal lines to command the shutdown of the servers (step 404).

In contrast, if the UPS power is between 6% and 100%, the data recorded in the server power control and management table, e.g. including the server priority sequence and the server power use and status, are used to determine whether a server is in an idle status and has a low priority level (step 403). If it is the case, the server is shut down (step 404); otherwise it is further determined whether the server is in an idle status and has a high priority level (step 405). If the server currently considered is idle and has a high priority status, its current power status is kept (step 406); otherwise it is determined whether the server dataflow level is low and whether the server has a low priority level (step 407). If it is the case, the server is shut down (step 404); otherwise it is determined whether the server dataflow level is low and the server has a high priority level (step 408). If it is the case, the server keeps its current power status (step 406); otherwise the server is shut down (step 404).

Knowing the invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A power control and management method, implemented for servers connected to an uninterruptible power system (UPS), the method comprising:
    detecting current power supply statuses of the UPS and the servers;
    detecting instantaneous status data of the UPS and the servers to generate a server power control and management table; and
    according to the server power control and management table, determining an activation time of the UPS and a shutdown sequence of the servers.

2. The method of claim 1, wherein when the server power control and management table includes information indicating a current server power interruption, the UPS is activated.

3. The method of claim 1, wherein the server power control and management table includes information indicating the priority level of the servers and information indicating the server instantaneous dataflow level.

4. The method of claim 3, wherein the server instantaneous dataflow level is generated according to the instantaneous status data of the servers.

5. The method of claim 3, wherein a user sets the server priority level.

6. The method of claim 1, wherein determining a shutdown sequence of the servers further comprises commanding the shutdown of all the servers if the UPS power is smaller than or equal to a server shutdown limit.

7. The method of claim 6, wherein a user sets the server shutdown limit.

8. The method of claim 6, wherein the server shutdown limit is about 5% of the UPS power.

9. The method of claim 1, wherein determining a shutdown sequence of the servers further comprises commanding a server to switch off if the same server is in an idle status and has a low priority level.

10. The method of claim 1, wherein determining a shutdown sequence of the servers further comprises commanding a server to keep a power status if the same server is in an idle status and has a high priority level.

11. The method of claim 1, wherein determining a shutdown sequence of the servers further comprises commanding a server to keep a power status if the same server has a low dataflow level and a high priority level.

12. The method of claim 1, wherein determining a shutdown sequence of the servers further comprises commanding a server to switch off if the same server has a low dataflow level and a low priority level.

* * * * *